(12) United States Patent
Jeong et al.

(10) Patent No.: US 11,742,473 B2
(45) Date of Patent: Aug. 29, 2023

(54) REDUCED GRAPHENE OXIDE-SILICON METAL PARTICLE COMPLEX, COMPLEX MANUFACTURING METHOD, AND SECONDARY BATTERY ELECTRODE COMPRISING COMPLEX

(71) Applicant: KOREA ELECTROTECHNOLOGY RESEARCH INSTITUTE, Changwon-si (KR)

(72) Inventors: Seung Yol Jeong, Changwon-si (KR); Geon Woong Lee, Changwon-si (KR); Jong Hwan Park, Gimhae-si (KR); Sun Hye Yang, Changwon-si (KR); Soo Yeon Jeong, Busan (KR); Ick Jun Kim, Busan (KR); Seon Hee Seo, Changwon-si (KR); Hye Jung Lee, Changwon-si (KR); Hee Jin Jeong, Changwon-si (KR); Joong Tark Han, Changwon-si (KR)

(73) Assignee: Korea Electrotechnology Research Institute

( * ) Notice: Subject to any disclaimer, the term of this patent is extended or adjusted under 35 U.S.C. 154(b) by 185 days.

(21) Appl. No.: 16/891,179

(22) Filed: Jun. 3, 2020

(65) Prior Publication Data
US 2020/0295344 A1 Sep. 17, 2020

Related U.S. Application Data

(63) Continuation of application No. PCT/KR2018/013677, filed on Nov. 12, 2018.

(30) Foreign Application Priority Data

Dec. 4, 2017 (KR) .......................... 10-2017-0165221

(51) Int. Cl.
*H01M 4/04* (2006.01)
*C01B 32/198* (2017.01)
(Continued)

(52) U.S. Cl.
CPC ............. *H01M 4/04* (2013.01); *C01B 32/198* (2017.08); *H01M 4/364* (2013.01); *H01M 4/386* (2013.01); *H01M 4/583* (2013.01)

(58) Field of Classification Search
None
See application file for complete search history.

(56) References Cited

U.S. PATENT DOCUMENTS

2014/0323596 A1* 10/2014 Jeong ..................... B82Y 40/00
516/77

FOREIGN PATENT DOCUMENTS

| KR | 10-2013-0015719 A | 2/2013 |
| KR | 10-2013-0060661 A | 6/2013 |

(Continued)

OTHER PUBLICATIONS

International Search Report(PCT/KR2018/013677), WIPO, dated Apr. 18, 2019.

(Continued)

*Primary Examiner* — Daniel S Gatewood
(74) *Attorney, Agent, or Firm* — Park & Associates IP Law Office

(57) ABSTRACT

The present invention relates to a reduced-graphene-oxide/silicon-metal-particle composite, a method of manufacturing the composite and an electrode for a secondary battery including the composite. The method of manufacturing the reduced-graphene-oxide/silicon-metal-particle composite includes preparing a reduced-graphene-oxide dispersion solution by reducing graphene oxide formed through cation-pi interaction, preparing a reduced-graphene-oxide/silicon- (Continued)

metal-particle dispersion solution by mixing the reduced-graphene-oxide dispersion solution with silicon metal particles, and manufacturing a composite powder having a core-shell structure by drying the reduced-graphene-oxide/silicon-metal-particle dispersion solution. Thereby, reduced graphene oxide can be formed using the graphene oxide dispersion solution having few defects and high purity obtained through cation-pi interaction, and dried to afford a composite powder having a core-shell structure, which is applicable to an electrode for a secondary battery.

7 Claims, 7 Drawing Sheets

(51) Int. Cl.
    *H01M 4/36*     (2006.01)
    *H01M 4/38*     (2006.01)
    *H01M 4/583*     (2010.01)

(56) References Cited

FOREIGN PATENT DOCUMENTS

| | | | |
|---|---|---|---|
| KR | 10-2014-0033515 | A | 3/2014 |
| KR | 10-2015-0116238 | A | 10/2015 |
| KR | 10-2016-0071926 | A | 6/2016 |
| KR | 10-1634723 | B1 | 6/2016 |
| KR | 1020160071926 | A * | 6/2016 |
| KR | 10-2016-0116896 | A | 10/2016 |
| KR | 10-1767393 | B1 | 8/2017 |

OTHER PUBLICATIONS

Korean Office Action (KR 10-2017-0165221), KIPO, dated Sep. 3, 2020.

Korean Notice of Allowance (KR 10-2017-0165221), KIPO, dated Jan. 27, 2021.

* cited by examiner

US 11,742,473 B2

REDUCED GRAPHENE OXIDE-SILICON METAL PARTICLE COMPLEX, COMPLEX MANUFACTURING METHOD, AND SECONDARY BATTERY ELECTRODE COMPRISING COMPLEX

REFERENCE TO RELATED APPLICATIONS

This is a continuation of International Patent Application PCT/KR2018/013677 filed on Nov. 12, 2018, which designates the United States and claims priority of Korean Patent Application No. 10-2017-0165221 filed on Dec. 4, 2017, the entire contents of which are incorporated herein by reference.

FIELD OF THE INVENTION

The present invention relates to a reduced-graphene-oxide/silicon-metal-particle composite, a method of manufacturing the composite, and an electrode for a secondary battery including the composite, and more particularly to a reduced-graphene-oxide/silicon-metal-particle composite, which is a composite powder having a core-shell structure obtained in a manner in which reduced graphene oxide is formed using a graphene oxide dispersion solution having few defects and high purity obtained through cation-pi interaction, added to a polymer for dispersion along with silicon metal particles, and then dried, a method of manufacturing the composite, and an electrode for a secondary battery including the composite.

BACKGROUND OF THE INVENTION

In recent years, as the demand for various small and lightweight electronic devices and ultra-high-capacity power storage systems has rapidly increased, worldwide interest in new energy sources has increased. Accordingly, research and development is focused on lithium secondary batteries, which are environmentally friendly, have high energy density, and are capable of being rapidly charged and discharged. In particular, various types of carbon-based, metal-based, and oxide-based materials, serving as anode active materials for lithium secondary batteries, play a key role in increasing power output and energy density, and thus are being intensively studied and commercialized. Among carbon-based materials serving as the anode active materials, graphite is a good material that is very stable and does not undergo volume expansion, but is unsuitable as an anode active material for use in mobile devices requiring high capacity due to the limited theoretical capacity thereof. Therefore, new high-capacity materials are required as the anode active materials, of which silicon (Si) has a high theoretical capacity. Silicon is a metal element that enables charging and discharging of lithium ions through alloying and dealloying with lithium (Li). Since silicon shows superior capacity per unit weight and volume compared to graphite, which is a conventional anode active material, it is being actively researched as a next-generation high-capacity lithium secondary battery material.

However, despite the high theoretical capacity of silicon, it is not easy to commercialize because a large volume expansion of 300% or more occurs due to a change in crystal structure when absorbing and storing lithium ions. Moreover, a phenomenon by which the structure of silicon is broken due to the continuous volume change occurs. Thereby, since the initial efficiency and cycle characteristics are lowered, technology to improve the reversibility of the lithium secondary battery and to maintain the high capacity thereof is essential.

In this regard, as disclosed in Korean Patent Application Publication No. 10-2015-0116238, entitled "Graphene/metal-nanoparticle composite, carbon nanofiber composite including the composite and secondary battery including the carbon nanofiber composite" and Korean Patent No. 10-1634723, entitled "Method of manufacturing silicon/carbon/graphene composite from silicon sludge", technology to modify the surface of metal particles and react the modified metal particles with graphene oxide to afford graphene-wrapped metal particles is known. In this case, however, the manufacturing process is complicated because modifying the surface of the metal particles, wrapping the metal particles with graphene oxide, and performing a reduction process are performed. Furthermore, in the process of reducing graphene oxide, there may occur a problem in which the state of the graphene oxide may change; for example, metal particles may be oxidized due to heat treatment.

SUMMARY OF THE INVENTION

Accordingly, an objective of the present invention is to provide a reduced-graphene-oxide/silicon-metal-particle composite, which is a composite powder having a core-shell structure obtained in a manner in which reduced graphene oxide is formed using a graphene oxide dispersion solution having few defects and high purity obtained through cation-pi interaction, added to a polymer for dispersion along with silicon metal particles, and then dried, a method of manufacturing the composite, and an electrode for a secondary battery including the composite.

In order to accomplish the above objective, the present invention provides a method of manufacturing a reduced-graphene-oxide/silicon-metal-particle composite, including preparing a reduced-graphene-oxide dispersion solution by reducing graphene oxide formed through cation-pi interaction, preparing a reduced-graphene-oxide/silicon-metal-particle dispersion solution by mixing the reduced-graphene-oxide dispersion solution with silicon metal particles, and manufacturing a composite powder having a core-shell structure by drying the reduced-graphene-oxide/silicon-metal-particle dispersion solution.

Here, the preparing the reduced-graphene-oxide dispersion solution may include forming graphite oxide by oxidizing graphite, forming graphene oxide by dispersing and exfoliating the graphite oxide, preparing a graphene oxide dispersion solution including the graphene oxide through cation-pi interaction, and preparing a reduced-graphene-oxide dispersion solution by reducing the graphene oxide dispersion solution.

Preferably, the forming the graphite oxide is performed by subjecting graphite flakes to acid treatment using a Brodie method, in which the acid treatment is performed by adding the graphite flakes with fuming nitric acid or sulfuric acid and with sodium chlorate ($NaClO_4$) or potassium permanganate ($KMnO_4$) and conducting stirring.

Preferably, the forming the graphene oxide is performed by dispersing the graphite oxide in an alkaline solvent to afford a graphite oxide dispersion solution and exfoliating the graphite oxide in the dispersion solution.

Preferably, the forming the graphene oxide dispersion solution includes forming a graphene oxide dispersion solution by dispersing and exfoliating the graphene oxide in an alkaline solvent and forming a cationically reacted graphene oxide dispersion solution through cation-pi interaction of a cation and a pi structure of an $sp^2$ region by positioning a cation in the center of an array in which carbon atoms in the graphene oxide dispersion solution are two-dimensionally connected by $sp^2$ bonding.

Preferably, the preparing the reduced-graphene-oxide dispersion solution is performed by neutralizing the cationically reacted graphene oxide dispersion solution in a solvent to afford a solution, which is then added with a reducing agent and reduced through a wet process, in which the reducing agent is selected from the group consisting of sodium hydroxide (NaOH), potassium hydroxide (KOH), ammonium hydroxide ($NH_4OH$), sodium borohydride ($NaBH_4$), hydrazine ($N_2H_4$), hydriodic acid, ascorbic acid and mixtures thereof.

Preferably, the preparing the reduced-graphene-oxide/silicon-metal-particle dispersion solution is performed by adding and mixing the reduced graphene oxide and the silicon metal particles with a water-soluble polymer in order to increase dispersibility of the reduced graphene oxide and the silicon metal particles in water, in which the water-soluble polymer is selected from the group consisting of polyvinyl alcohol, polyethylene glycol, polyethyleneimine, polyamideamine, polyvinyl formamide, polyvinyl acetate, polyacrylamide, polyvinylpyrrolidone, polydiallyldimethylammonium chloride, polyethylene oxide, polyacrylic acid, polystyrene sulfonic acid, polysilicic acid, polyphosphoric acid, polyethylene sulfonic acid, poly-3-vinyloxypropane-1-sulfonic acid, poly-4-vinylphenol, poly-4-vinylphenyl sulfonic acid, polyethylene phosphoric acid, polymaleic acid, poly-4-vinylbenzoic acid, methyl cellulose, hydroxyethyl cellulose, carboxymethyl cellulose, sodium carboxymethyl cellulose, hydroxypropyl cellulose, sodium carboxymethyl cellulose, polysaccharide, starch and mixtures thereof.

Preferably, the composite powder obtained in the manufacturing the composite powder having a core-shell structure is configured such that the silicon metal particles are present inside as a core and the reduced graphene oxide is formed as an outer shell that surrounds the silicon metal particles, and the manufacturing the composite powder having a core-shell structure is performed by spray drying the reduced-graphene-oxide/silicon-metal-particle dispersion solution so that the surface of the silicon metal particles is surrounded by the reduced graphene oxide.

Preferably, the spray drying is repeatedly performed so that the silicon metal particles are surrounded by the reduced graphene oxide and are not exposed outside, and the spray drying is performed in a manner in which dispersion solutions containing reduced graphene oxides having different sizes are prepared respectively and then alternately spray dried.

In addition, the present invention provides a reduced-graphene-oxide/silicon-metal-particle composite, which is a composite powder having a core-shell structure in which silicon metal particles are present inside as a core and reduced graphene oxide is formed as an outer shell that surrounds the silicon metal particles, manufactured by spray drying a reduced-graphene-oxide/silicon-metal-particle dispersion solution including the reduced graphene oxide obtained by reducing graphene oxide formed through cation-pi interaction and the silicon metal particles mixed with the reduced graphene oxide.

In addition, the present invention provides an anode for a secondary battery, including a current collector and an anode active material formed on one surface of the current collector and including a reduced-graphene-oxide/silicon-metal-particle composite, in which the reduced-graphene-oxide/silicon-metal-particle composite is a composite powder having a core-shell structure in which silicon metal particles are present inside as a core and reduced graphene oxide is formed as an outer shell that surrounds the silicon metal particles, manufactured by spray drying a reduced-graphene-oxide/silicon-metal-particle dispersion solution including the reduced graphene oxide obtained by reducing graphene oxide formed through cation-pi interaction and the silicon metal particles mixed with the reduced graphene oxide.

According to the present invention, a composite powder having a core-shell structure can be obtained in a manner in which reduced graphene oxide is formed using a graphene oxide dispersion solution having few defects and high purity obtained through cation-pi interaction, added to a polymer for dispersion along with silicon metal particles, and then dried. Therefore, unlike a conventional method of manufacturing a composite by forming graphene oxide, a reduction process is not performed after manufacturing the composite, and a one-component-type reduced-graphene-oxide/silicon-metal-particle composite solution is prepared to afford a composite powder, which can be applied to an electrode for a secondary battery.

DETAILED DESCRIPTION OF THE INVENTION

Hereinafter, a detailed description will be given of a reduced-graphene-oxide/silicon-metal-particle composite, a method of manufacturing the composite, and an electrode for a secondary battery including the composite according to embodiments of the present invention with reference to the accompanying drawings.

The reduced-graphene-oxide/silicon-metal-particle composite according to the present invention is manufactured by spray drying a reduced-graphene-oxide/silicon-metal-particle dispersion solution including reduced graphene oxide obtained by reducing graphene oxide formed through cation-pi interaction and silicon metal particles mixed with the reduced graphene oxide. Here, the composite is configured such that the silicon metal particles are present inside as a core and the reduced graphene oxide is formed as an outer shell that surrounds the silicon metal particles.

The anode for a secondary battery including the composite includes a current collector and an anode active material formed on one surface of the current collector and including a reduced-graphene-oxide/silicon-metal-particle composite. Here, the reduced-graphene-oxide/silicon-metal-particle composite is obtained by spray drying a reduced-graphene-oxide/silicon-metal-particle dispersion solution including reduced graphene oxide obtained by reducing graphene oxide formed through cation-pi interaction and silicon metal particles mixed with the reduced graphene oxide.

In the method of manufacturing the reduced-graphene-oxide/silicon-metal-particle composite according to the present invention, preparing a reduced-graphene-oxide dispersion solution by reducing graphene oxide formed through cation-pi interaction is first performed (S0).

Here, the preparing the reduced-graphene-oxide dispersion solution (S0) may include forming graphite oxide by oxidizing graphite (S1), forming graphene oxide by dispersing and exfoliating the graphite oxide (S2), preparing a graphene oxide dispersion solution including the graphene oxide through cation-pi interaction (S3), and preparing a reduced-graphene-oxide dispersion solution by reducing the graphene oxide dispersion solution (S4).

Figure 1:
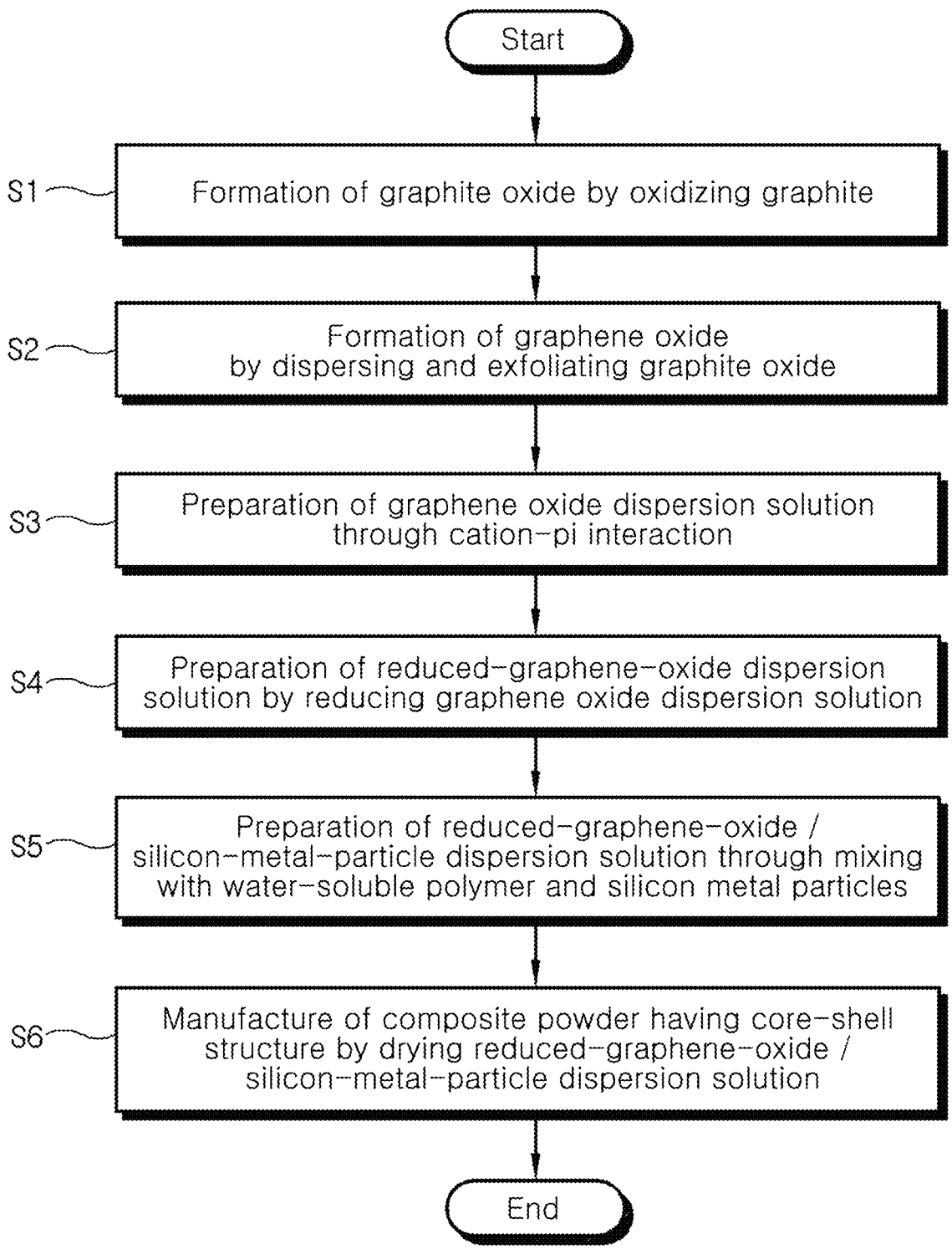
FIGS. 1 and 2 are flowcharts showing a process of manufacturing a reduced-graphene-oxide/silicon-metal-particle composite according to an embodiment of the present invention.

More specifically, as shown in FIG. 1, graphite is oxidized to form graphite oxide (S1).

Graphite oxide in a powder phase is synthesized from graphite flakes in a powder phase. The graphite oxide powder is obtained by subjecting a graphite flake powder having high purity of 99.9995% to acid treatment and then performing repeated washing using an aqueous solution and removal of impurities using a centrifuge. For acid treatment, graphite flakes having high purity are added with strong acid such as fuming nitric acid or sulfuric acid and with sodium chlorate ($NaClO_4$) or potassium permanganate ($KMnO_4$) and oxidized with stirring at room temperature for 48 hr. After neutralization using deionized water, filtering and washing are repeated. The oxidized graphite solution is dried and ground to afford a graphite oxide powder.

Here, the acid treatment is performed using a Brodie method (B. C. Brodie Ann. Chim. Phys., 59, 466-472, 1860), rather than a Staudenmaier method (L. Staudenmaier, Ber. Dtsch. Chem. Gas., 31, 1481-1499, 1898) or a Hummers method (W. Hummers et al., J. Am. Chem. Soc., 80, 1339, 1958), which is typically used. Since graphite oxide flakes obtained through the Hummers method are easily exfoliated later, the Hummers method is mainly used to prepare graphene oxide. Although the Hummers method enables the graphite oxide to be easily exfoliated, it is disadvantageous in that the purity of the graphene oxide is low and the quality of the graphene oxide deteriorates because many oxidation functional groups are contained therein. In contrast, the Brodie method makes it difficult to exfoliate graphite oxide but the prepared graphene oxide has high purity and few defects and thus exhibits high quality. In the present invention, graphene oxide is prepared using a Brodie method, rather than the typical Hummers method.

Graphite oxide is dispersed and exfoliated, thus forming graphene oxide (S2).

The graphite oxide powder prepared in S1 is dispersed in a solvent to afford a graphite oxide dispersion solution, after which the graphite oxide is exfoliated in the dispersion solution, thus forming graphene oxide having few defects and high purity.

The solvent for dispersing the graphite oxide powder is preferably an alkaline solvent, and the alkaline solvent is selected from the group consisting of a sodium hydroxide (NaOH) aqueous solution, a potassium hydroxide (KOH) aqueous solution, an ammonium hydroxide ($NH_4H$) aqueous solution, a lithium hydroxide (LiOH) aqueous solution, a calcium hydroxide ($Ca(OH)_2$) aqueous solution and mixtures thereof, and the pH of the solvent that enables dispersion is 8 or higher, and preferably 10 or higher.

The graphite oxide dispersion solution is treated using at least one of a sonicator, a homogenizer and a high-pressure homogenizer, whereby the graphite oxide is dispersed and exfoliated. Here, the time required for dispersion and exfoliation is 10 min to 5 hr. If the processing time is less than 10 min, dispersion and exfoliation may be insufficient. On the other hand, if the processing time exceeds 5 hr, many defects may be formed, making it impossible to obtain graphene oxide having high quality.

A monolayer graphene oxide dispersion solution is prepared through cation-pi interaction (S3).

The dispersed and exfoliated graphene oxide is formed into a cationically reacted graphene oxide dispersion solution through cation-pi interaction. Specifically, the graphene oxide is dispersed and exfoliated in an alkaline solvent to form a graphene oxide dispersion solution, after which a cation is positioned in the center of an array in which carbon atoms in the graphene oxide dispersion solution are two-dimensionally connected by $sp^2$ bonding, thereby forming a cationically reacted graphene oxide dispersion solution through cation-pi interaction of the cation and the pi structure of the $sp^2$ region.

The cationically reacted graphene oxide dispersion solution may be obtained by maintaining the graphene oxide dispersion solution at room temperature for a reaction time of about 1 min to about 10 hr in the state in which an external physical force such as sonication is not applied.

Here, the cationically reacted graphene oxide dispersion solution may be obtained by maintaining the graphene oxide dispersion solution having a concentration of 1 mg/L to 50 g/L at room temperature for a reaction time of about 10 min. If the concentration of the graphene oxide dispersion solution is less than 1 mg/L, it is difficult to form high-concentration graphene oxide. On the other hand, if the concentration of the graphene oxide dispersion solution exceeds 50 g/L, agglomeration of graphene oxide may occur.

Figure 2:
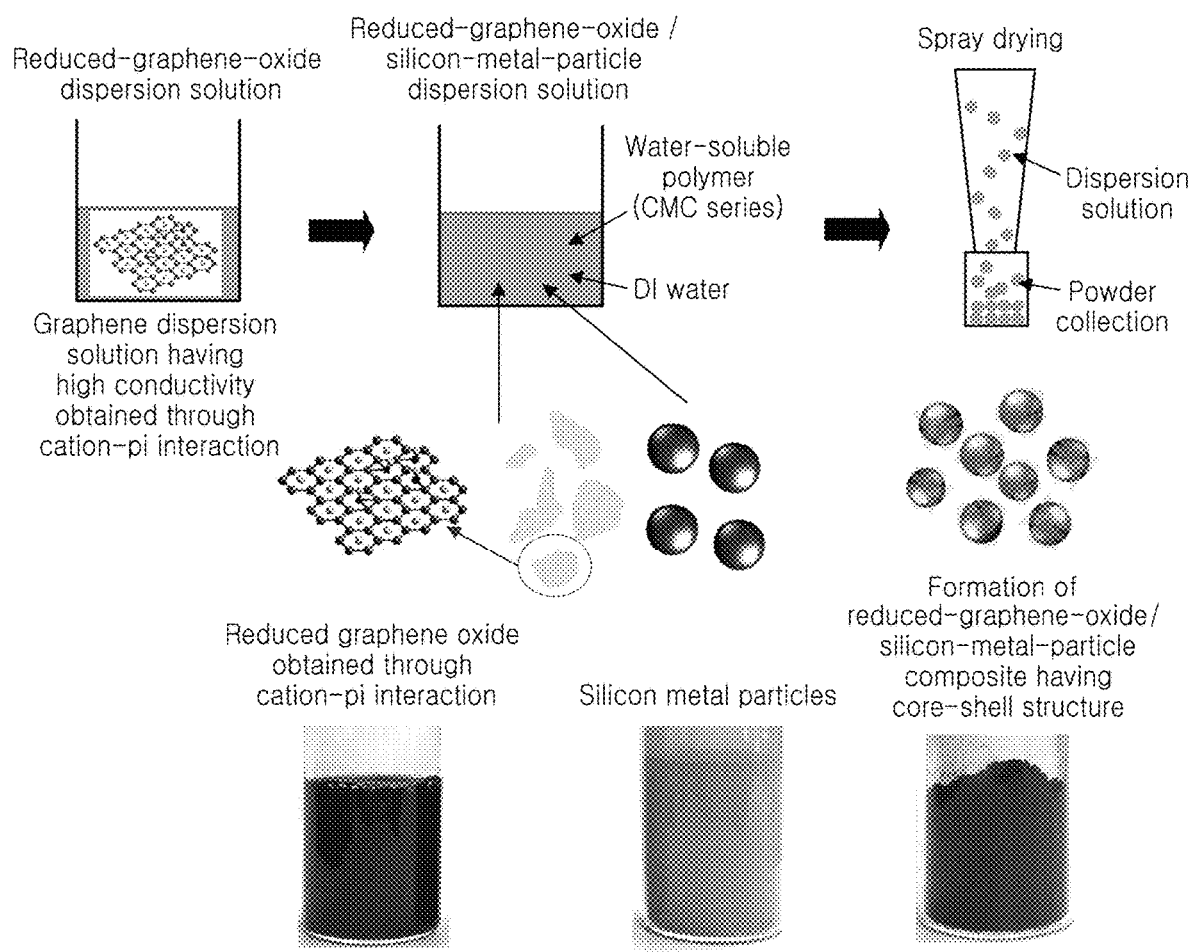

As shown in FIG. 2, the reaction between the monovalent cation such as sodium ($Na^+$), potassium ($K^+$), ammonium ($NH_4^+$) or lithium ($Li^+$) and the pi structure of the hexagonal $sp^2$ region is activated by the alkaline solvent contained in the graphene oxide dispersion solution. The reaction is facilitated by maintaining the reaction time for removal of oxygen functional group of graphene oxide and interaction with the cation through the weak reduction reaction of the alkaline solvent. In FIG. 2, the added solvent is a sodium hydroxide aqueous solution and the cation is a sodium ion.

The cationically reacted graphene oxide dispersion solution is prepared using a solvent volatilization process, such as rotary evaporation, centrifugation or stirring, suitable for activating the cation-pi interaction. The local oxidation functional group is removed by controlling the temperature and time to further increase the hexagonal $sp^2$ region of graphene, which may be adsorbed by the cation, through weak reduction. Furthermore, when water is evaporated using a solvent volatilization process, cation-pi interaction may be activated and a high-concentration dispersion solution is prepared.

The monolayer graphene oxide dispersion solution is reduced, thus preparing a reduced-graphene-oxide dispersion solution (S4).

The cationically reacted monolayer graphene oxide dispersion solution is neutralized in the solvent, after which the resulting solution is added with a reducing agent and reduced through a wet process, thereby obtaining a reduced-graphene-oxide dispersion solution. Here, the reducing agent may be used without limitation, so long as it is typically used in the art, and is preferably selected from the group consisting of, for example, sodium hydroxide (NaOH), potassium hydroxide (KOH), ammonium hydroxide ($NH_4OH$), sodium borohydride ($NaBH_4$), hydrazine ($N_2H_4$), hydriodic acid, ascorbic acid and mixtures thereof.

After preparing the reduced-graphene-oxide dispersion solution including the above steps (S0), the reduced-graphene-oxide dispersion solution is mixed with a water-soluble polymer and silicon metal particles, thus preparing a reduced-graphene-oxide/silicon-metal-particle dispersion solution (S5).

Pure silicon metal particles, the surface of which is not modified, are prepared, and the reduced-graphene-oxide dispersion solution obtained in S4 is mixed with the water-soluble polymer and the silicon metal particles, thus obtaining a reduced-graphene-oxide/silicon-metal-particle dispersion solution. The reduced-graphene-oxide dispersion solution includes water, but the reduced graphene oxide and the silicon metal particles are not uniformly dispersed in water. Thus, the reduced graphene oxide and the silicon metal particles are added and mixed with the water-soluble polymer in order to increase the dispersibility thereof in water, thereby preparing a reduced-graphene-oxide/silicon-metal-particle dispersion solution.

Here, the water-soluble polymer is preferably selected from the group consisting of polyvinyl alcohol, polyethylene glycol, polyethyleneimine, polyamideamine, polyvinyl formamide, polyvinyl acetate, polyacrylamide, polyvinylpyrrolidone, polydiallyldimethylammonium chloride, polyethylene oxide, polyacrylic acid, polystyrene sulfonic acid, polysilicic acid, polyphosphoric acid, polyethylene sulfonic acid, poly-3-vinyloxypropane-1-sulfonic acid, poly-4-vinylphenol, poly-4-vinylphenyl sulfonic acid, polyethylene phosphoric acid, polymaleic acid, poly-4-vinylbenzoic acid, methyl cellulose, hydroxyethyl cellulose, carboxymethyl cellulose, sodium carboxymethyl cellulose, hydroxypropyl cellulose, sodium carboxymethyl cellulose, polysaccharide, starch and mixtures thereof, but is not limited thereto.

The reduced-graphene-oxide/silicon-metal-particle dispersion solution is dried, thus manufacturing a composite powder having a core-shell structure (S6).

The reduced-graphene-oxide/silicon-metal-particle dispersion solution obtained in S5 is dried, thus manufacturing a composite powder having a core-shell structure in which the silicon metal particles are present inside as the core and the reduced graphene oxide is formed as an outer shell that surrounds the silicon metal particles.

Here, in order to dry the reduced-graphene-oxide/silicon-metal-particle dispersion solution, a spray-drying process is most preferable. In the case of spray drying, it may be performed only once, but it is preferable to perform spray drying two or more times to completely surround the silicon metal particles with the reduced graphene oxide. As such, spray drying may be performed in a manner in which the reduced-graphene-oxide/silicon-metal-particle dispersion solution is sprayed several times, or as necessary, the reduced-graphene-oxide/silicon-metal-particle dispersion solution may be sprayed, and then a dispersion solution including only reduced graphene oxide may be spray dried to surround the silicon surface. During spray drying, the water-soluble polymer and water evaporate, and only reduced graphene oxide and silicon metal particles remain, thus forming a core-shell composite.

Also, when the reduced-graphene-oxide/silicon-metal-particle dispersion solution is spray dried several times, dispersion solutions including reduced graphene oxides having different sizes may be prepared respectively and then alternately spray dried to surround the silicon metal particles with the reduced graphene oxide so that the silicon metal particles are not exposed outside. For example, a dispersion solution including reduced graphene oxide having a relatively small size may be spray dried first, after which a dispersion solution including reduced graphene oxide having a relatively large size may be spray dried, thereby coating the surface of the silicon metal particles with the reduced graphene oxide. In contrast, a dispersion solution including reduced graphene oxide having a relatively large size may be spray dried first, and then a dispersion solution including reduced graphene oxide having a relatively small size may be spray dried.

A better understand of the present invention will be given through the following examples.

EXAMPLE 1

10 g of pure graphite (purity of 99.9995%, −200 mesh, made by Alfar Aesar), 350 ml of fuming nitric acid, and 74 g of sodium chlorate divided into amounts of 37 g were sequentially mixed at room temperature. The resulting mixture was stirred for 4 hr, followed by neutralization, washing, filtering, cleaning and drying, thus preparing graphene oxide. The graphene oxide thus prepared was added in a concentration of 300 mg/L to a solution of KOH in deionized water (pH 10) using a homogenizer at 15,000 rpm for 1 hr, thus obtaining a uniform graphene oxide dispersion solution.

Next, in order to apply cation-pi interaction, the reaction time of the graphene oxide dispersion solution at room temperature was maintained for 1 hr or more. The graphene oxide dispersion solution was lyophilized for 10 hr or more to afford a graphene oxide powder, from which the accurate graphene oxide concentration can be calculated.

As the solvent for dispersing the graphene oxide powder, deionized water was used. The graphene oxide dispersion solution having a concentration of 1 g/l was added with 1 wt % of sodium carboxymethyl cellulose and 40 µl of hydriodic (HI) acid and reduced with stirring at 60° C. for 10 hr at 400 rpm. Thereby, reduced graphene oxide dispersed at a high concentration was formed. The size of the reduced graphene oxide was 5 to 10 µm. Thereafter, in order to remove excess hydriodic acid, potassium hydroxide (KOH) was added, stirred and centrifuged, thereby removing additives.

EXAMPLE 2

The reduced-graphene-oxide dispersion solution was mixed with silicon metal particles having a size of 10 to 20 µm with stirring at 500 rpm. Thereafter, dispersion was induced by adding about 3 wt % of sodium carboxymethyl cellulose. The reduced-graphene-oxide/silicon-metal-particle composite dispersion solution was spray dried to afford a powder. Here, in order to increase the coverage of silicon, the prepared composite was subjected to spray drying three times at most. Moreover, in order to increase coverage depending on the size of graphene, coating with reduced graphene oxide having a small size of 5 μm or less and then with reduced graphene oxide having a large size of 10 μm or more was repeated. Here, coating with reduced graphene oxide having a large size and then with reduced graphene oxide having a small size may be performed.

FIG. 2 schematically shows the formation of a powder by dispersing silicon metal particles in the reduced-graphene-oxide dispersion solution using the water-soluble polymer and performing spray drying according to an embodiment of the present invention. More specifically, the uniformly dispersed reduced-graphene-oxide dispersion solution having few defects and high conductivity is prepared through cation-pi interaction and mixed with the water-soluble polymer and the silicon metal particles, thus forming a reduced-graphene-oxide/silicon-metal-particle dispersion solution. The reduced-graphene-oxide/silicon-metal-particle dispersion solution thus obtained is spray dried, thus preparing a reduced-graphene-oxide/silicon composite powder having a core-shell structure. The images for the dispersion solution, the silicon metal particles and the composite powder represent the results obtained through individual processes.

Figure 3:
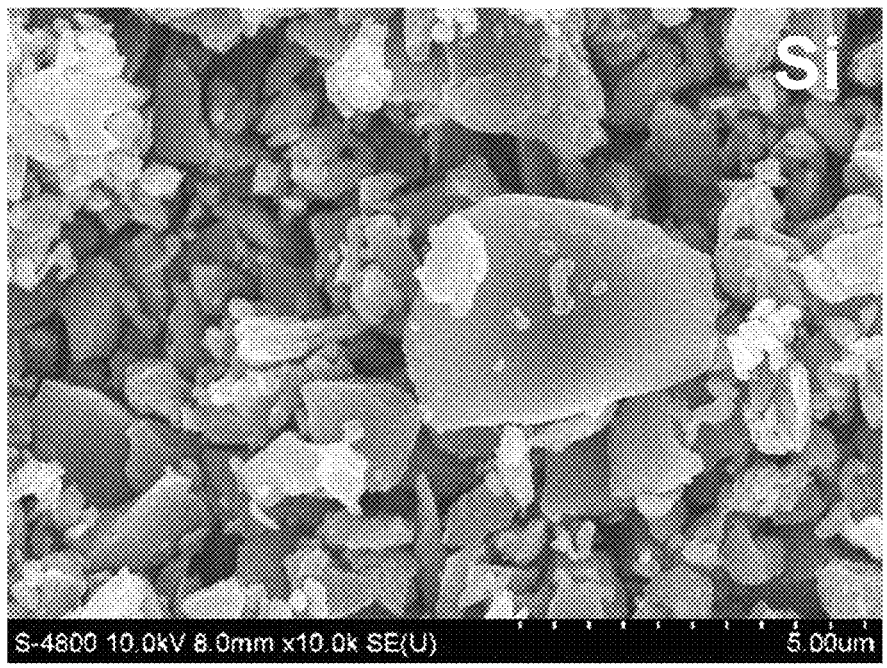
FIG. 3 shows electron microscope images showing silicon metal particles and a reduced-graphene-oxide/silicon-metal-particle composite according to an embodiment of the present invention.
Figure 3:
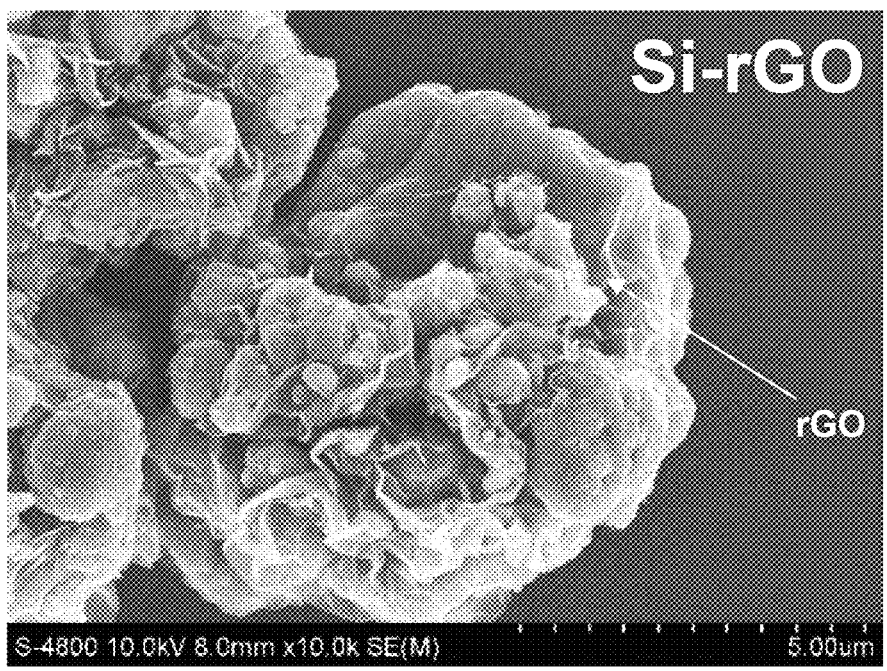

FIG. 3 is an electron microscope image of the silicon metal particles and an electron microscope image showing the shape of the reduced-graphene-oxide/silicon-metal-particle composite powder. Here, it can be confirmed for the composite powder that the silicon metal particles are coated with reduced graphene oxide to form a core-shell structure.

Figure 4:
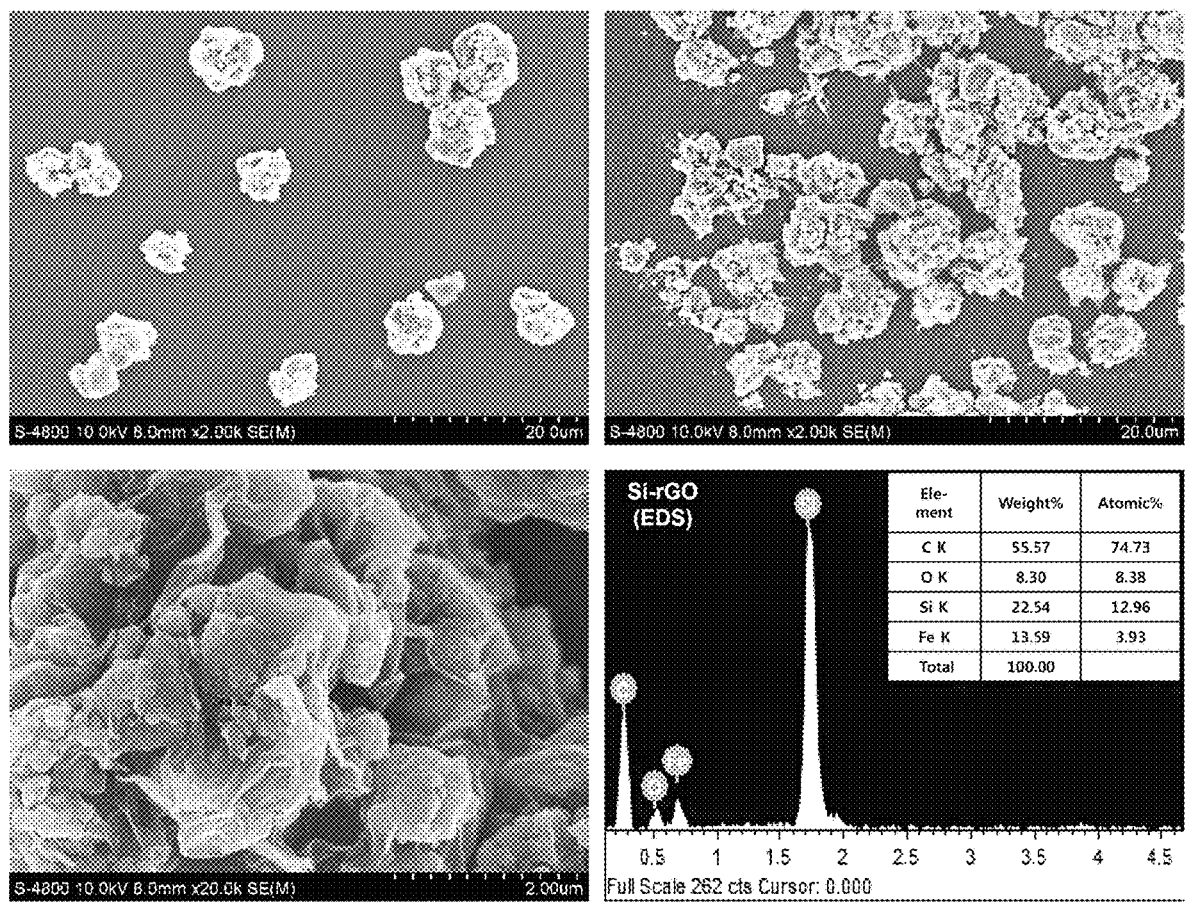
FIG. 4 shows electron microscope images of the surface shape of the reduced-graphene-oxide/silicon-metal-particle composite according to an embodiment of the present invention and the results of analysis of elements thereof through EDS.

FIG. 4 is electron microscope images showing the shape of the reduced-graphene-oxide/silicon-metal-particle composite powder. In the case of conventional silicon metal particles, silicon metal particles may agglomerate, but it can be seen that a micro-sized ball is formed after coating with reduced graphene oxide using spray drying. Since uniform dispersion in the solvent is induced by forming the core-shell structure using graphene, uniform particles are formed upon spray drying without agglomeration to a size of hundreds of micrometers or more. Based on the results of measurement of the elements of the composite through EDS, it can be confirmed that the amounts of carbon and silicon are high.

Figure 5:
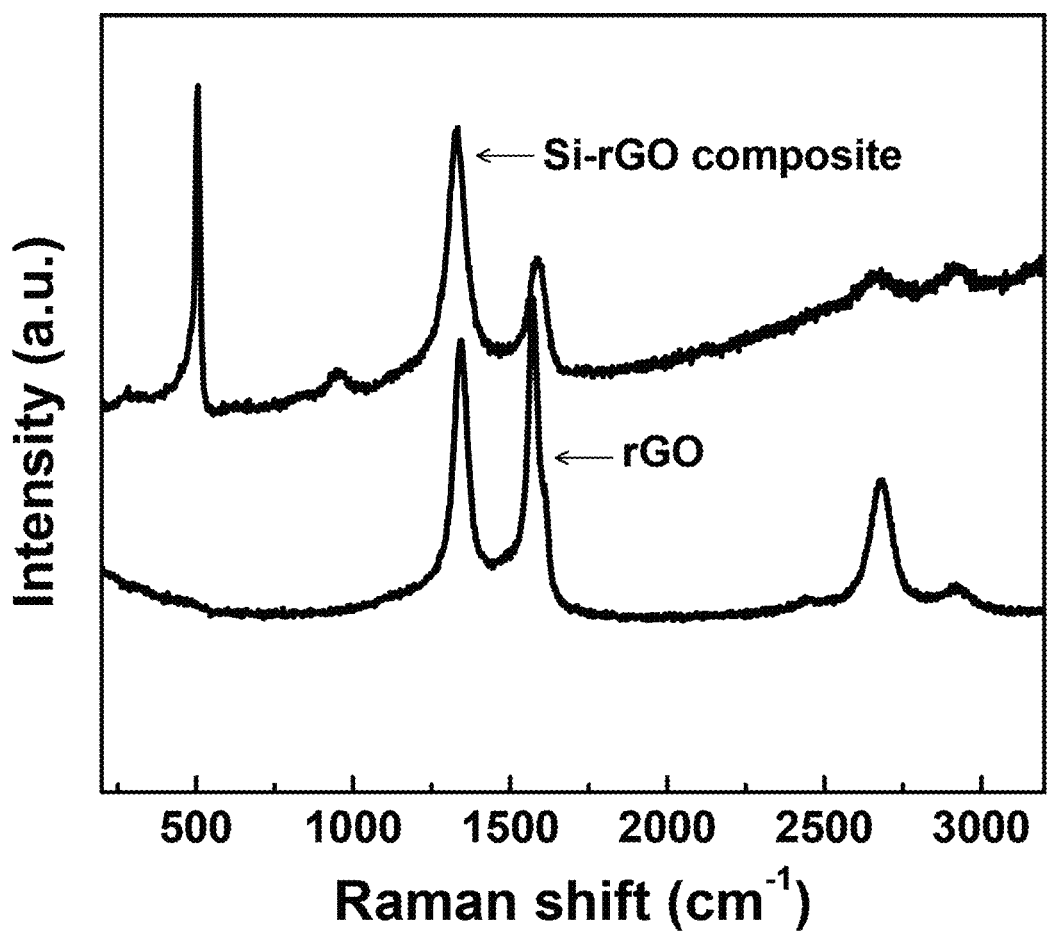
FIG. 5 shows the results of measurement of the reduced graphene oxide and the reduced-graphene-oxide/silicon-metal-particle composite through Raman spectroscopy.

FIG. 5 shows the properties of the reduced graphene oxide and the reduced-graphene-oxide/silicon-metal-particle composite powder obtained through resonance Raman spectroscopy. Upon Raman spectroscopy, graphene showed G peak at about 1594 cm$^{-1}$, confirming coating with graphene. In particular, the appearance of the silicon peak after formation of the composite was observed. Moreover, the graphene crystallinity and shape change results can be confirmed through the D band/G band peak ratio. In this case, after forming the composite, the peak ratio becomes larger, and since existing reduced graphene oxide is a two-dimensional nanomaterial, it is applied flat onto the substrate. However, when applied onto a three-dimensional structure such as silicon metal particles, coating is carried out while structural change occurs, and thus a structural change due to strain takes place, thereby increasing the D/G peak ratio. Based on the above results, it can be confirmed that the reduced graphene oxide is uniformly applied in a shell structure on the silicon metal particles.

Figure 6:
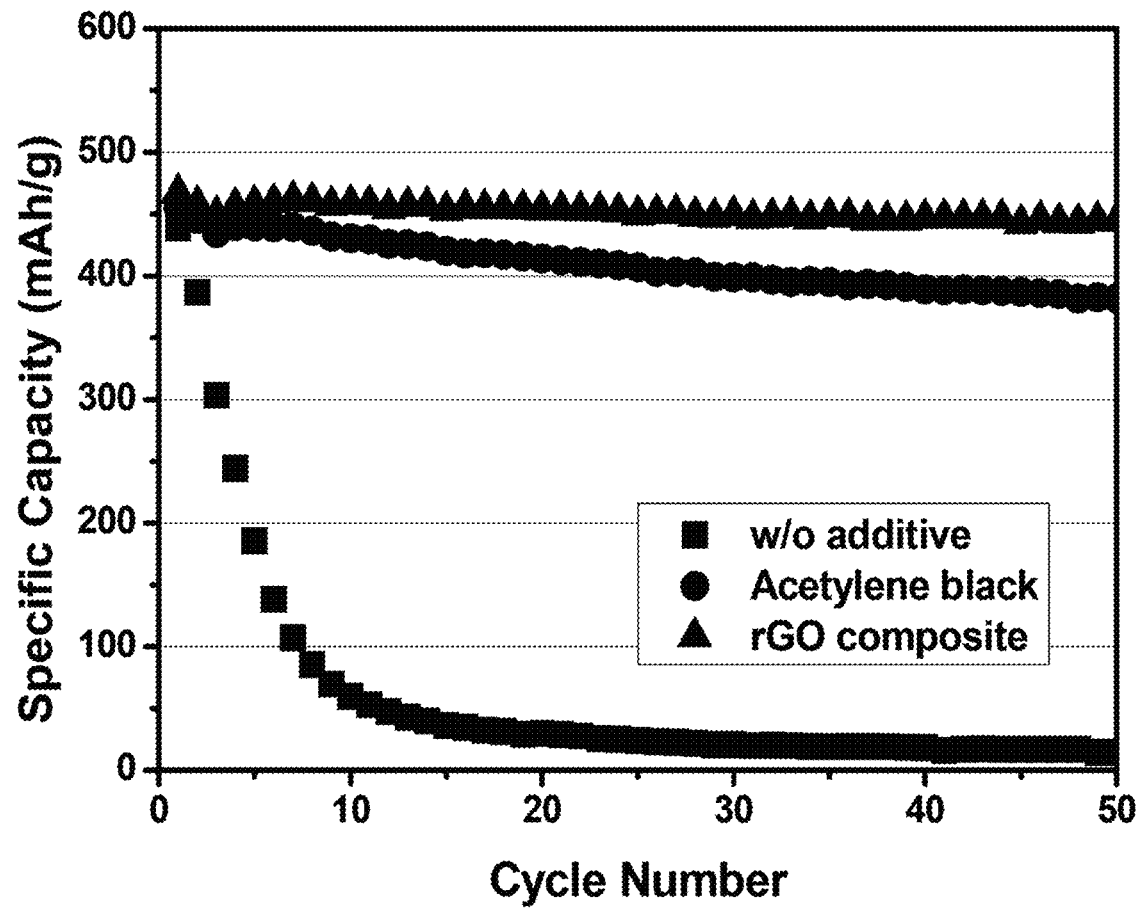
FIG. 6 is a graph showing specific capacity depending on the number of cycles when an additive is not added to a slurry for an anode, when typical acetylene black is added, and when the reduced-graphene-oxide/silicon-metal-particle composite is added, in order to evaluate the electrochemical properties of a lithium secondary battery.

FIG. 6 is a graph showing electrochemical properties when an additive is not added, when commercially available acetylene black is added, and when the reduced-graphene-oxide-based composite (rGO composite) is formed, upon manufacturing an electrode material for use in the anode for a lithium ion battery. As such, the electrodes that were used were manufactured in the form of half-cells using lithium metal as the cathode and three different types of materials as the anode. When no additive is added, the change in specific capacity depending on the number of cycles is very large. This shows that specific capacity is rapidly decreased with an increase in the number of cycles because the silicon crystal structure is broken due to the volume expansion of silicon. When conventional acetylene black is added, improved cycle characteristics may be exhibited, but the specific capacity decreases with an increase in the number of cycles. However, the reduced-graphene-oxide/silicon composite having a core-shell structure exhibits very stable characteristics, thus manifesting the effect of graphene on preventing the crystal structure from being broken due to volume expansion of silicon.

Figure 7:
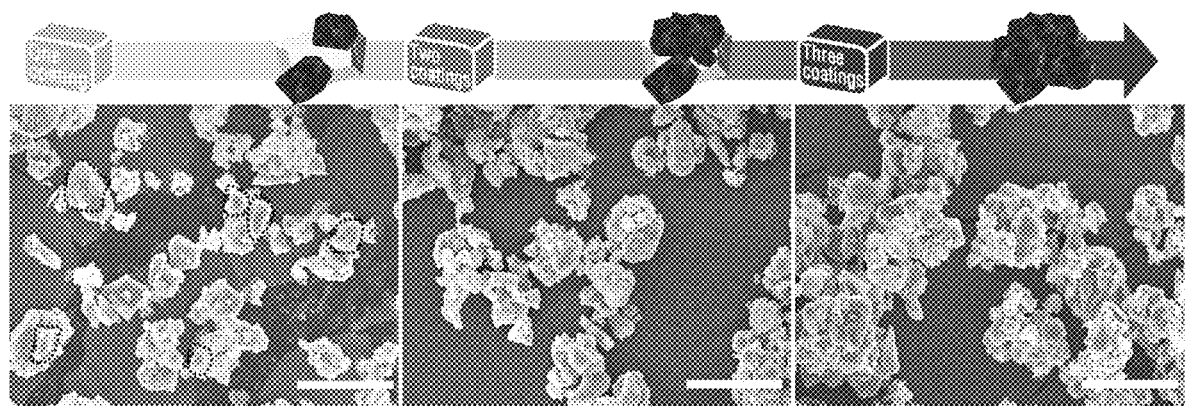
FIG. 7 shows electron microscope images after coating with reduced graphene oxide once, two times, and three times, in order to evaluate the coverage of the reduced-graphene-oxide/silicon-metal-particle composite.

FIG. 7 shows results indicating that effective graphene coating may be induced by changing conditions for spray drying in order to more effectively apply reduced graphene oxide. Conventional formation of the composite powder by spray drying once also shows improved characteristics. However, since commercially available silicon metal particles vary greatly in size, the number of spray-drying processes may be increased to form a composite powder through uniform graphene coating, and specifically, composite powder obtained by spray drying once according to the conventional technique may be collected and then dispersed again in reduced graphene oxide, thus obtaining a composite powder. Thereby, it is possible to more effectively coat the silicon metal particles and manufacture a composite having a core-shell structure.

What is claimed is:

1. A method of manufacturing a reduced-graphene-oxide/silicon-metal-particle composite, comprising:
    preparing a reduced-graphene-oxide dispersion solution by reducing graphene oxide formed through cation-pi interaction and mixing the reduced-graphene-oxide dispersion solution with a water-soluble polymer and silicon metal particles to form a first reduced-graphene-oxide/silicon-metal-particle dispersion solution;
    preparing a second reduced-graphene-oxide/silicon-metal-particle dispersion solution comprising reduced graphene oxide having sizes in a range that is different from a sizes range of the reduced graphene oxide in the first reduced-graphene-oxide/silicon-metal-particle dispersion solution; and
    spray drying the first reduced-graphene-oxide/silicon-metal-particle dispersion solution followed by spray drying the second reduced-graphene-oxide/silicon-metal-particle dispersion solution so that the silicon metal particles are surrounded by the reduced graphene oxide to manufacture a composite powder having a core-shell structure in which a surface of the silicon metal particles is surrounded by reduced graphene oxide, such that the silicone metal particles are present inside as a core and the reduced graphene oxide is formed as an outer shell of the core-shell structure,
    wherein the water-soluble polymer is selected from the group consisting of polyvinyl alcohol, polyethyleneimine, polyamideamine, polyvinyl formamide, polyvinyl acetate, polyacrylamide, polyvinylpyrrolidone, polydiallyldimethylammonium chloride, polyethylene oxide, polyacrylic acid, polystyrene sulfonic acid, polysilicic acid, polyphosphoric acid, polyethylene sulfonic acid, poly-3-vinyloxypropane-1-sulfonic acid, poly-4-vinylphenol, poly-4-vinylphenyl sulfonic acid, polyethylene phosphoric acid, polymaleic acid, poly-4- vinylbenzoic acid, methyl cellulose, hydroxyethyl cellulose, carboxymethyl cellulose, sodium carboxymethyl cellulose, hydroxypropyl cellulose, sodium carboxymethyl cellulose, polysaccharide, starch and mixtures thereof.

2. The method of claim 1, wherein the preparing the reduced-graphene-oxide dispersion solution comprises:
   forming graphite oxide by oxidizing graphite;
   forming graphene oxide by dispersing and exfoliating the graphite oxide;
   preparing a graphene oxide dispersion solution comprising the graphene oxide through cation-pi interaction; and
   preparing a reduced-graphene-oxide dispersion solution by reducing the graphene oxide dispersion solution.

3. The method of claim 2, wherein the forming the graphite oxide is performed by subjecting a graphite flake to acid treatment using a Brodie method, wherein the acid treatment is performed by adding the graphite flake with fuming nitric acid or sulfuric acid and with sodium chlorate (NaClO4) or potassium permanganate (KMnO4) and conducting stirring.

4. The method of claim 2, wherein the forming the graphene oxide is performed by dispersing the graphite oxide in an alkaline solvent to afford a graphite oxide dispersion solution and exfoliating the graphite oxide in the dispersion solution.

5. The method of claim 2, wherein the forming the graphene oxide dispersion solution comprises:
   forming a graphene oxide dispersion solution by dispersing and exfoliating the graphene oxide in an alkaline solvent; and
   forming a cationically reacted graphene oxide dispersion solution through cation-pi interaction of a cation and a pi structure of an sp2 region by positioning a cation in a center of an array in which carbon atoms in the graphene oxide dispersion solution are two-dimensionally connected by sp2 bonding.

6. The method of claim 1, wherein the preparing the reduced-graphene-oxide dispersion solution is performed by neutralizing a cationically reacted graphene oxide dispersion solution in a solvent to afford a solution, which is then added with a reducing agent and reduced through a wet process,
   wherein the reducing agent is selected from the group consisting of sodium hydroxide (NaOH), potassium hydroxide (KOH), ammonium hydroxide (NH4OH), sodium borohydride (NaBH4), hydrazine (N2H4), hydriodic acid, ascorbic acid and mixtures thereof.

7. The method of claim 1, wherein the spray drying of the first reduced-graphene-oxide/silicon-metal-particle dispersion solution followed by spray drying of the second reduced-graphene-oxide/silicon-metal-particle dispersion solution is repeatedly performed so that the silicon metal particles are surrounded by the reduced graphene oxide and are not exposed outside.

* * * * *